Jan. 8, 1952  E. GORIN  2,581,650
METHOD OF CONVERTING CARBON TO ELECTRICAL ENERGY
Filed Aug. 31, 1951
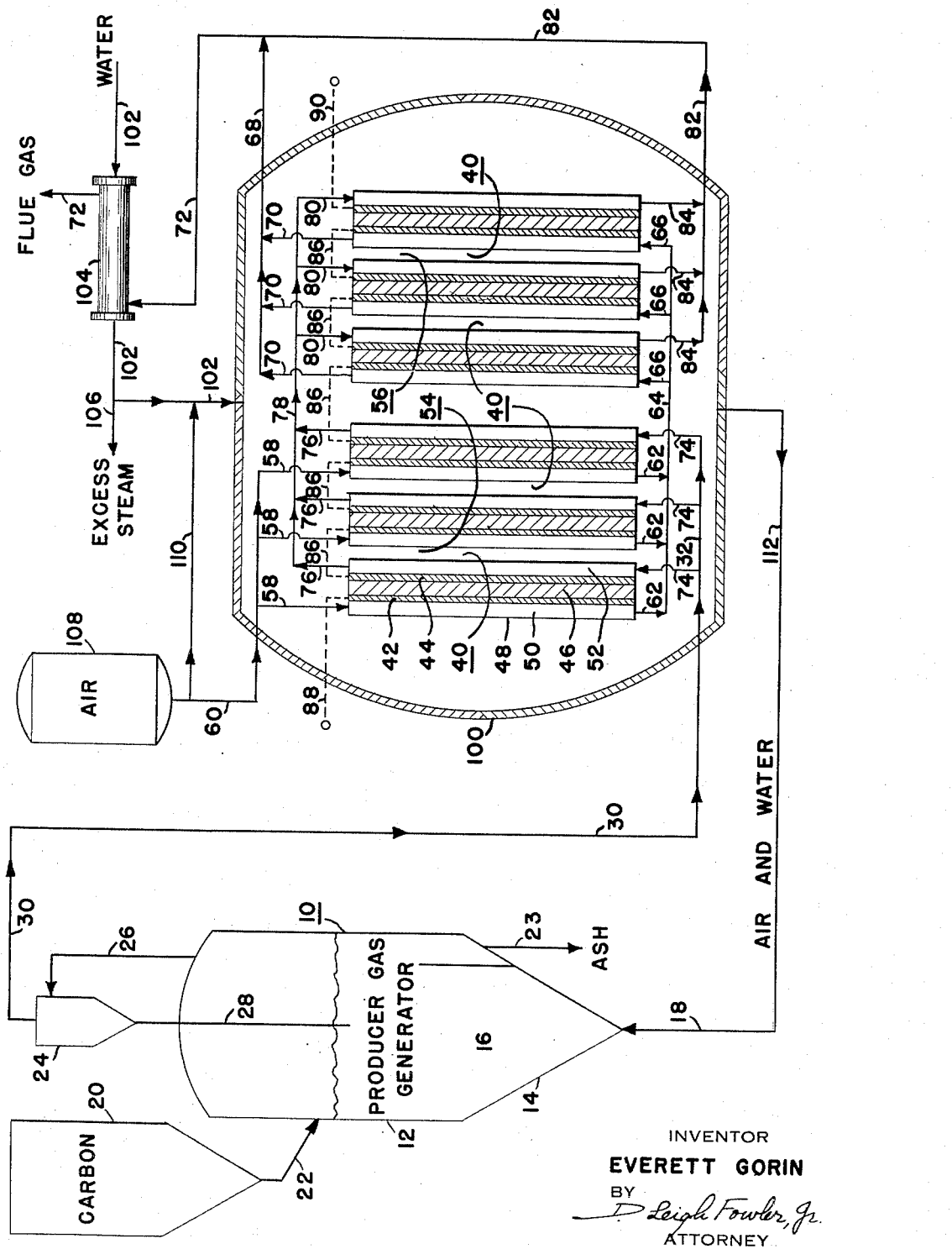
INVENTOR
EVERETT GORIN
BY
*D. Leigh Fowler, Jr.*
ATTORNEY Patented Jan. 8, 1952

2,581,650

UNITED STATES PATENT OFFICE 2,581,650

METHOD OF CONVERTING CARBON TO ELECTRICAL ENERGY

Everett Gorin, Pittsburgh, Pa., assignor to Pittsburgh Consolidation Coal Company, Pittsburgh, Pa., a corporation of Pennsylvania Application August 31, 1951, Serial No. 244,565

5 Claims. (Cl. 136—84)

This invention relates to the conversion of carbon to electrical energy and, more particularly, to a process for converting carbon to electrical energy through the medium of a fuel cell.

Fuel cells have been proposed and developed which are adapted to generate electricity by the combustion of carbon monoxide and hydrogen using air as the oxidizing gas. Particular success has been achieved when the cells are operated at high temperatures. In the prior fuel cells of this type, the carbon monoxide and hydrogen are first generated in a separate gasification zone and then fed to the cathode end of a fuel cell. The over-all efficiency of conversion of carbon to electric power in such systems, assuming that the maximum efficiency heretofore realized in each of the two separate steps is achieved, is of the order of 40 per cent.

In my copending application Serial Number 168,806, filed June 17, 1950, now U. S. Patent 2,570,543 granted October 9, 1951, and assigned to the assignee of the present invention, a process is described for converting carbon to electrical energy at efficiencies as high as 75 per cent. These high efficiencies are attained by operating the fuel cell at an elevated temperature above that of the carbon monoxide and hydrogen generation zone and by transferring the heat from the high temperature fuel cell to the gas generation zone to provide the heat required to maintain the endothermic steam-carbon reaction. To achieve the maximum efficiencies possible with this process, it is necessary to use a reactive carbon or add a suitable catalyst because of the relatively low temperature of the gasification zone. It would be desirable to provide a process for converting carbon to electrical energy at substantially higher efficiencies than have been achieved by prior methods and yet would permit operation of the gas generation zone at the conventional high temperatures.

In accordance with the present invention, a process is provided for converting carbon to electrical energy which has an over-all efficiency approaching 60 per cent. While this efficiency is not as high as that possible with the process described in the above-mentioned application, it is nevertheless substantially higher than the 40 per cent efficiency achieved in processes hitherto proposed. Furthermore, as will be shown, the process of this invention permits the operation of the gas generation zone at conventional temperatures which are independent of those maintained in the electrochemical zone, i. e., the fuel cell.

The present process comprises reacting steam and an oxidizing gas, preferably air, with carbon in a gasification zone under optimum conditions for converting the carbon to CO and $H_2$. This gaseous product is then conducted to a separate electro-chemical reaction zone comprising one or more fuel cells which are designed to operate at elevated temperatures. An oxidizing gas, e. g., air, is circulated to the oxygen electrode of the fuel cell from which it is transported to the CO and $H_2$ electrode through the electrolyte in the form of an oxidizing ion. The gaseous product from the gasification zone is thus oxidized in the fuel cell. The heat of combustion thereof is in part converted to electrical energy while the remainder is utilized to maintain the temperature of the fuel cell above 900° F. Steam is circulated in direct heat exchange relation with the hot electrochemical zone and is thus heated to a temperature approaching that of the fuel cell. Thus high temperature steam is conducted to the gasification zone for reaction with carbon. The temperature of the gasification zone is maintained at least as high as that of the fuel cells by burning a portion of the carbon therein. By thus operating the fuel cells at elevated temperatures above 900° F., preferably 1300° F. to 1650° F. and by utilizing the heat developed in the fuel cells to heat the steam for use in the gasification zone, efficiencies are obtained which unexpectedly are half again as high as those of the prior systems.

For a better understanding of the present invention and its objects, reference should be had to the following detailed description of a preferred embodiment of the invention; and to the accompanying drawing in which is shown, partly diagrammatically and partly in section, an apparatus in which the preferred embodiment may be practiced.

Referring specifically to the accompanying drawing for a detailed description of the apparatus, numeral 10 designates a gas generating vessel having a substantially cylindrical top section 12 and an inverted cone-shaped bottom section 14. This vessel is adapted to confine a fluidized bed of solids 16 at steam-carbon reaction temperatures and pressures. Associated with the bottom portion of the vessel is an inlet feed conduit 18 which is adapted to introduce gaseous reactants into vessel 10. A hopper 20 for storing solids is connected to the gas generating vessel 10 by a transfer conduit 22, through which solids are introduced into vessel 10.

A cyclone separator 24 is connected to vessel 10 by conduit 26 and is provided for separating any solid fines that may be entrained in the product gas and for returning them to the bed 16 through a dipleg 28. Leading from the cyclone separator is a conduit 30 for conducting the product gas to a plurality of fuel cells 40.

The fuel cells 40 are identical in construction and are adapted to operate at temperatures as high as 1850° F. Each of them comprises two rectangular plate electrodes 42 and 44, arranged vertically in parallel spaced relationship to each other. Electrode 42 constitutes the anode of the cell and consists of iron-magnetite. Electrode 44 constitutes the cathode of the cell and consists of iron-iron oxide. The two electrodes are separated by a solid electrolyte 46 consisting of a high melting glass prepared from a mixture of sodium silicate, monazite sand, tungsten trioxide and sodium carbonate. A suitable composition, for example, consists of 43% sodium carbonate, 27% monazite sand, 20% of tungsten trioxide and 10% sodium silicate. The electrolyte may be shaped in the form of tubes or stamped in the form of a flat rectangular or circular plate. In either case, the electrodes are pressed against both sides of the electrolyte and an oxidizing gas passed over the anode and a reducing gas over the cathode. It is to be understood that the composition of the fuel cell per se forms no part of the present invention, it being sufficient for my purposes that the cell be adapted to operate at elevated temperatures. Such cells are fully described in the literature. Gas Cell with Solid Electrolyte—Bull. Acad. Sci. USSR Classe SCI. Tech. 215–218 (1946); Zeit. fur Electrochemie 27, 199–208; Zeit. fur Electrochemie, 44, 727–32, (1937). The cells described below are constructed with the electrolyte shaped in the form of a rectangular plate.

Each of the fuel cells 40 is provided with a box-like metal housing 48 having side walls spaced from the electrodes 42 and 44 to provide gas passages 50 and 52 respectively. Passage 50 is adapted to carry on oxidizing gas in intimate contact with electrode 42, while passage 52 is adapted to carry producer gas in intimate contact with electrode 44. Each of the individual cells shown will in actual practice consist of a compact stacked assembly of anywhere from two to ten cells.

The plurality of fuel cells 40 are divided into two sections 54 and 56 with an equal number of cells in each section. The cells in a given section are arranged in parallel while the two sections are arranged in series with respect to gas flow therethrough. The arrangement of banks of cells in series is adapted to minimize the power loss resulting from the loss in cell voltage due to the decrease in partial pressure of the reactants as they are consumed in the cell reaction. Air is circulated to the upper ends of passages 50 in the cells of section 54 through conduits 58 from a main air conduit 60. Conduits 62 connect the lower ends of passages 50 with an inter-connecting conduit 64. The latter in turn is connected to the lower end of passages 50 of the cells in section 56 by means of conduits 66. The upper ends of passages 50 of the cells in section 56 are connected to a flue gas conduit 68 by means of conduits 70. The flue gas conduit 68 joins with a main flue gas conduit 72.

The gas conduit 32 is connected to the lower ends of the passages 52 of the cells in section 54 by conduits 74. The upper ends of passages 52 communicate by means of conduits 76 with a conduit 78 which is adapted to convey gas from the passages 52 in section 54 to the upper ends of passages 52 in section 56 through passages 80. The lower ends of passages 52 of the cells in section 56 communicate with a flue gas conduit 82 through conduits 84. Conduit 82 joins with conduit 72.

The cells 40 are connected in series by electrical conductors 86 extending between electrodes. Electrical conductors 88 and 90 constitute the terminal leads of the cell system and may be connected to any electrical storage or power-driven unit.

The bank of fuel cells 40 is enclosed in a gas tight tank 100. The latter is connected to a source of water by a conduit 102 which is arranged in heat exchange relation with the hot flue gas conduit 72 by means of a heat exchanger 104. A conduit 106 is connected to conduit 102 on the outlet side of the heat exchanger 104. An air supply tank 108 communicates directly with conduit 60 and indirectly with conduit 102 by means of a transfer conduit 110. Leading from tank 100 to the gas generator inlet line 18 is an air and steam conduit 112.

The operation of the above system will be described as applied to the conversion of carbonaceous solids, for example, coal. When handling coking coals, I prefer to maintain the fuel in a fluidized condition in the gasification zone to eliminate difficulty due to coking of the coal. When a lump size non-caking fuel is employed, I prefer to use a fixed bed gasification process.

Finely divided coal is fed into vessel 10 from hopper 20 through conduit 22. The amount of solids fed to vessel 10 is regulated to provide a bed, when fluidized, having a level in the upper portion of section 12 of the vessel. The bed is maintained in a fluidized condition by suitable regulation of the velocity of the gases passing therethrough in the well-known manner.

The temperature of the gasification zone in vessel 10 is maintained at the point of optimum conversion of carbon to CO and $H_2$ by steam and air preferably in the neighborhood of 1700° F. The necessary heat is supplied by combustion of the fuel with air in situ.

The products of the steam-carbon reaction comprise an ash or a low carbon solid which may be withdrawn through conduit 23 as necessary to maintain the desired bed level, and a gaseous mixture containing principally carbon monoxide and hydrogen. The gaseous product is conducted to the cyclone separator 24 and there freed of any entrained solid fines which are returned to the fluidized bed 16 through dipleg 28. The solid free gas is then conveyed through conduit 30 and conduits 74 to the lower ends of passages 52 of the fuel cells in section 54. Concurrently, therewith, air is fed through conduit 60 and conduits 58 to the upper ends of passages 50 of the fuel cells in section 54.

At the anodes 42 of the cells in section 54, electrons are picked up by the iron oxide to release oxide ion or its equivalent into the solid electrolyte. The oxygen contained in the air circulating through passages 50 reacts with iron to maintain its state of oxidation, the remaining nitrogen and unreacted oxygen being discharged through conduits 62 and 64. At the cathodes 44 oxide ion is discharged to release electrons and oxidize the electrode to a higher oxide of iron. The CO and $H_2$ circulating through passages 52 reduce the higher iron oxide thus formed and are in turn converted to $CO_2$ and $H_2O$ respectively which are discharged along with unreacted CO and $H_2$ through the conduits 76 and 78. A portion of the energy thus released by the combustion of the producer gas generates electricity through the medium of the electrolyte 46. The same cell reactions occur in the second section 56 between the electrodes and the unreacted gases from the first section 54, but with the gases circulating in an opposite direction from that in section 54.

The electricity generated by the fuel cells is conducted from the cell system through the electrical leads 88 and 90. The individual cells generate a voltage in the range of 0.5–0.9 depending on the density of the current withdrawn from the cell. The remainder of the energy is released as heat. The cells are designed to operate at temperatures as high as 1850° F. For the purpose of this invention, the selected operating temperature lies in the range from 900° F. to 1850° F. However, I prefer that the temperature be above 1200° F. in order to minimize polarization at the electrodes and the resistance of the electrolyte.

It is to be understood that the number of fuel cells shown is only for the purpose of illustration. The precise number employed will depend on the design of the particular system and on the capacity desired.

As a specific example of the operation of the above system, the following conditions and results are cited. The temperature of the fuel cells is about 1292° F. and that of the fluidized bed of carbon about 1700° F. At a steam conversion of 70% in the gasification zone, the efficiency for direct production of electrical energy is 57.4% in contrast to a maximum calculated efficiency of 42.8% where the excess heat of the cells is not utilized to heat the steam and air supplied to the gasification zone. Furthermore, if steam produced by heat transfer with the cells in excess of that required in the gasification zone is converted to power by conventional methods at an efficiency of 20% (lower than possible in conventional practice because of the relatively low temperature level of the steam), the over-all efficiency of the present process is 59.8%.

In the above system, I have shown the use of the fluidized solids technique in the gasification zone. If desired, a fixed bed type of system may be employed. In such a system, a temperature gradient is established in the bed of solids, ranging for example, from 2400° F. at the bottom to 1000° F. at the top.

My system may also be operated by using a gaseous carbonaceous material such as natural gas, i. e., methane, in place of coal. In this case, the coal-steam-air reaction is replaced by the methane-steam-air reaction which is carried out preferably in the range of 1200–1800° F. with the use of a catalyst such as Ni-MgO or Ni-$Al_2O_3$. In the accompanying claims, the term "carbon" is used to designate any carbon-containing material capable of reacting with steam to produce carbon monoxide and hydrogen.

Thus, according to the above description, I have provided a system for converting carbon to electrical energy at efficiencies approaching 60%. In this system, the gasification zone and the electrochemical zone are operated at elevated temperatures that are independent of each other and represent the optimum operating temperature for that particular component of the system. By arranging for heat transfer between the two components in the specific manner described, flexibility of operation together with high conversion efficiency is achieved.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method of converting carbon to electrical energy which comprises reacting steam and an oxdizing gas with carbon in a gasification zone under conditions conducive to the formation of a gaseous product containing CO and $H_2$, passing said gaseous product and an oxidizing gas separately into an electrochemical reaction zone wherein said gaseous product is oxidized and its heat of combustion is converted in part to electrical energy, maintaining the temperature of said electrochemical zone above 900° F. by means of the heat of combustion developed therein, passing steam in direct heat exchange relation with said electrochemical zone, thereafter conducting said steam to said gasification zone, and recovering the electrical energy produced.

2. The method of converting carbon to electrical energy which comprises reacting steam and an oxidizing gas with carbon in a gasification zone under conditions conducive to the formation of a gaseous product containing CO and $H_2$, passing said gaseous product and an oxidizing gas separately into electrochemical reaction zone wherein said gaseous product is oxidized and its heat of combustion is converted in part to electrical energy, maintaining the temperature of said electrochemical zone above 900° F. by means of the heat of combustion developed therein, maintaining the temperature of said gasification zone at least as high as that of said electrochemical zone, passing steam in direct heat exchange relation with said electrochemical zone, thereafter conducting said steam to said gasification zone, and recovering the electrical energy produced.

3. The method of converting coal to electrical energy which comprises reacting steam and air with coal in a gasification zone under conditions conducive to the formation of a gaseous product containing CO and $H_2$, passing said gaseous product and air separately into an electrochemical reaction zone wherein said gaseous product is oxidized and its heat of combustion is converted in part to electrical energy, maintaining the temperature of said electrochemical zone above 900° F. by means of the heat of combustion developed therein, passing steam in direct heat exchange relation with said electrochemical zone, thereafter conducting said steam to said gasification zone, and recovering the electrical energy produced.

4. The method of converting coal to electrical energy which comprises reacting steam and air with coal in a gasification zone under conditions conducive to the formation of a gaseous product containing CO and $H_2$, passing said gaseous product and air separately into an electrochemical reaction zone wherein said gaseous product is oxidized and its heat of combustion is converted in part to electrical energy, maintaining the temperature of said electrochemical zone above 900° F. by means of the heat of combustion developed therein, maintaining the temperature of said gasification zone at least as high as that of said electrochemical zone, passing steam in direct heat exchange relation with said electrochemical zone, thereafter conducting said steam to said gasification zone, and recovering the electrical energy produced.

5. The method of converting carbon to electrical energy which comprises reacting air and steam with carbon in a gasification zone under conditions conducive to the formation of a gaseous product containing CO and $H_2$, passing said gaseous product and air separately into an electrochemical zone wherein said gaseous product is oxidized and its heat of combustion is converted in part to electrical energy, maintaining the temperature of said electrochemical zone above 900° F. by means of the heat of combustion developed therein, passing the hot flue gas from said electrochemical zone in heat exchange relation with a stream of water to thereby convert the latter to steam, passing the steam thus formed together with air in direct heat exchange relation with said electrochemical zone, then conducting the resulting high temperature steam and air to said gasification zone, and recovering the electrical energy produced.

EVERETT GORIN.

No references cited.